June 27, 1967 — R. S. SMITH — 3,327,390
SHEARS
Filed Nov. 16, 1964 — 2 Sheets-Sheet 1

INVENTOR.
ROBERT S. SMITH
BY McCormick, Paulding & Huber
ATTORNEYS

United States Patent Office 3,327,390
Patented June 27, 1967

3,327,390
SHEARS
Robert S. Smith, Woodbury, Conn., assignor to Seymour Smith and Son, Incorporated, Oakville, Conn., a corporation of Connecticut
Filed Nov. 16, 1964, Ser. No. 411,471
11 Claims. (Cl. 30—248)

This invention relates to improvements in a shears structure and, more particularly, to a shears of the portable type which can be operated in one hand (such as a grass trimming shears) and which has two handles grasped simultaneously, one being a fixed handle (preferably the upper handle) to which a blade is fixed and the other being a movable handle which is connected to a movable blade and which is closed upon the fixed handle to close the movable blade on the fixed blade, the movable blade being spring biased to open position relative to the fixed blade.

In shears of the aforementioned type, the cutting action is performed by the movable blade being pivotable relative to the fixed blade and by maintaining point contact between the cutting edges of the blades as the movable blade is pivoted relative to the fixed blade. That is, in most shears constructions, the fixed blade is the lower blade and the upper blade is the movable blade, the said movable blade being canted downwardly so that its cutting edge will ride over the cutting edge of the lower blade in point contact throughout the lengths of the blades as the movable blade is pivoted from an open position, wherein it is spaced horizontally from the cutting edge of the fixed blade, to a closed position wherein the movable blade is disposed over the fixed blade.

In most prior shears constructions of the aforementioned general type, there are numerous parts used in the shears, all of which are cast and/or machined from metal, and in most such constructions, almost all of the parts are exposed to clippings and to dirt particles and the like which may cause jamming or malfunction, and in many such constructions, a separate element is employed for canting the movable blade downwardly, the movable blade being loosely pivoted relative to the fixed blade.

It is the general object of the present invention to provide a shears of the aforementioned general type which has a reduced number of parts when compared to the really successful prior art devices and which is of such construction that many of the parts can be made more economically, as for example, as plastic injection molded elements or as economically die cast metal elements.

It is a further, but more specific object of the invention to provide a shears structure of such style that the shear blades can be sharpened without a major disassembly of the parts, and more easily than the case with prior art shears of the same general type.

A still further object of the invention is to provide a shears wherein the "edge riding" action is accomplished very efficiently and positively.

Another object of the invention is to provide a shears construction wherein a major portion of the operating parts are housed so as to reduce the ingress of clippings, dirt, etc., and to provide a construction needing a minimum of lubrication which would otherwise cause such clippings and dirt particles to adhere.

A still further object of the invention is to provide a shears which, within the general object of economy in manufacture, is easy to assemble and which features a movable handle which is pivoted relative to the fixed handle without using a pivot shaft, stud or the like.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

Figure 1:
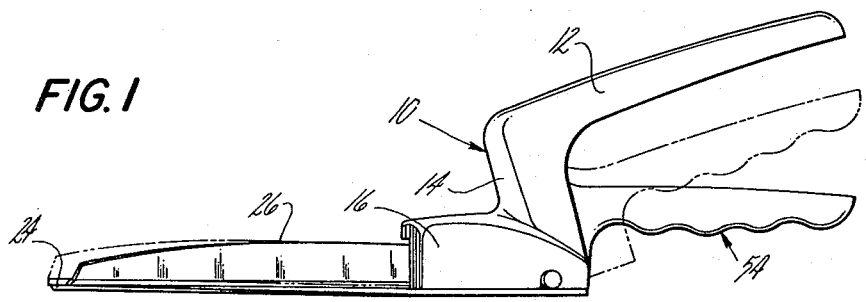
FIG. 1 is a side elevational view of a grass shears which is constructed in accordance with the present invention, showing the open position of the shear blades and handles, in full lines, and the closed positions thereof in broken lines.
Figure 5:
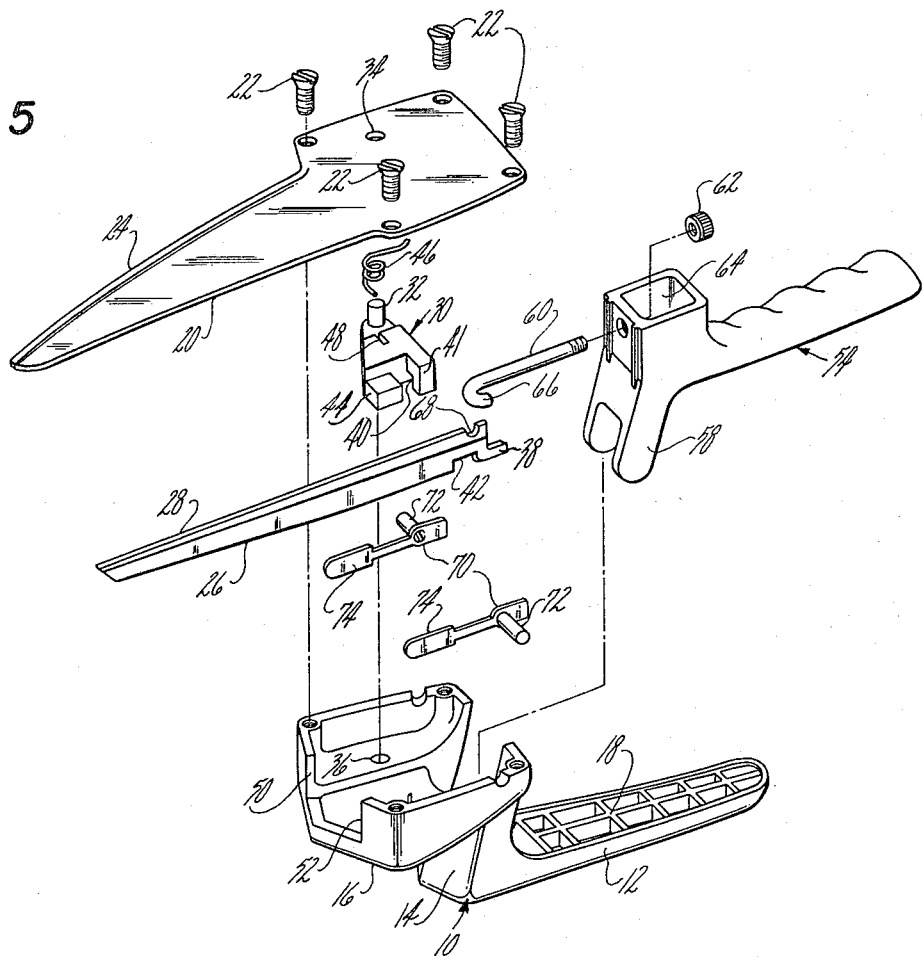
FIG. 5 is an exploded perspective view calculated to reveal the relative positions of the elements or parts on assembly, the view being inverted from the normal position of the shears to reveal more details.
Figure 6:
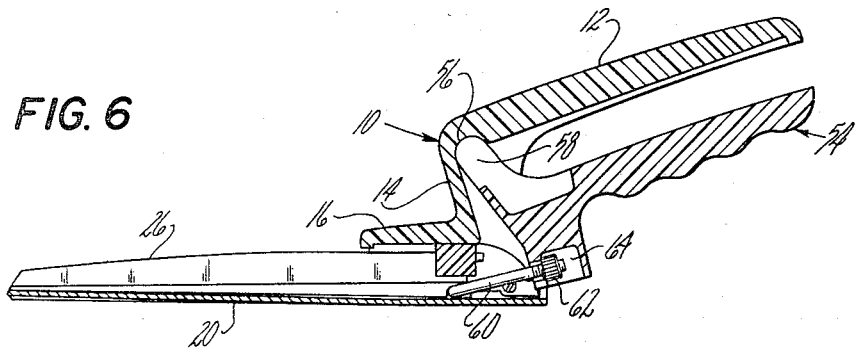
FIG. 6 is a vertical longitudinal cross-sectional view through the shears, with the bottom shear blade attached, and as indicated generally by the line 6—6 in FIG. 4.

As can be seen with reference to FIGS. 1 and 6, the shears includes an upper handle 10 which is generally Z-shaped and which comprises an upper portion 12, an intermediate portion 14, and a bottom portion 16. Preferably, the upper handle 10 is made of plastic and can be economically manufactured on a mass production basis as a plastic injection molded part. In further keeping with economy, the handle 10 is molded so that the upper portion 12 thereof is cellular, as indicated at 18 in FIG. 5, and this cellular construction increases the strength of the said upper portion which, in operation of the shears, is engaged in the palm of the operator's hand so that rather substantial forces can be applied thereto.

The bottom portion 16 of the upper handle 10 is seen to be molded or otherwise formed hollow and with a bottom opening. This bottom opening of the upper handle 10 is closed by a lower shear blade 20 which is rigidly secured to the upper handle as by a plurality of screws 22, 22 which are threaded into suitable tapped openings in the bottom surface of the upper handle 10. Thus, the lower shear blade 20 cooperates with the hollow bottom portion of the upper handle 10 to define a housing which is open at the front and open at the rear, and it will be observed that the lower blade 20 projects forwardly from said bottom portion or housing 16.

It will also be noted that the said lower blade 20, in the normal position of the shears for operation, such as is illustrated in FIGS. 1 and 6, is disposed in a generally horizontal plane. This blade has but one cutting edge, this being the sharpened edge 24 which curves gently throughout its projecting length from the portion closing the bottom side of the housing 16. It should also be noted, that the marginal portion of the blade 20 adjacent its cutting edge 16 is offset upwardly from the horizontal plane of the body of the blade. This provides extra strength and rigidity to the cutting edge of the blade and sets it off for easy sharpening while the said blade is still attached to the upper handle 10.

In further keeping with the present invention, the shears includes a movable upper blade 26 which is normally disposed in a generally vertical plane. Like the lower blade 20, the upper blade 26 has a sharpened cutting edge 28 which is offset from the plane of the body of the blade, the edge 28 being offset horizontally in the direction of the cutting edge 24 of the lower blade 20 when the two blades are in an open position as shown in FIG. 2.

Figure 2:
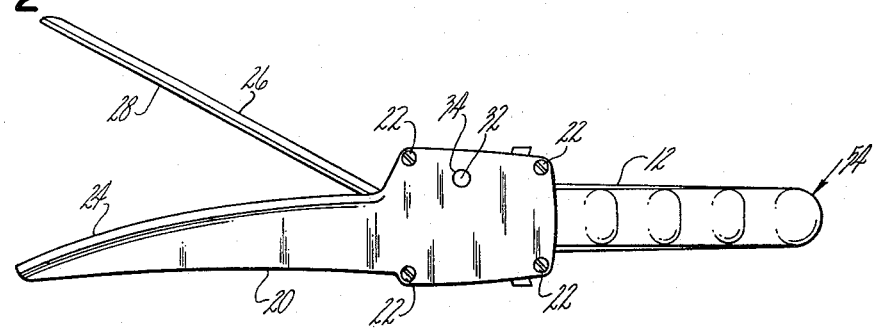
FIG. 2 is a bottom view of the shears shown in FIG. 1 with the blades open.
Figure 3:
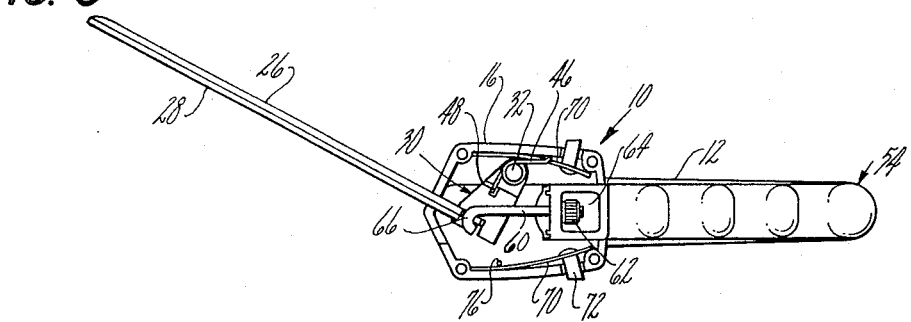
FIG. 3 is a view similar to FIG. 2, but with the bottom shear blade removed to reveal additional elements of the shears construction in their relative positions corresponding to the open position of the shear blades.
Figure 4:
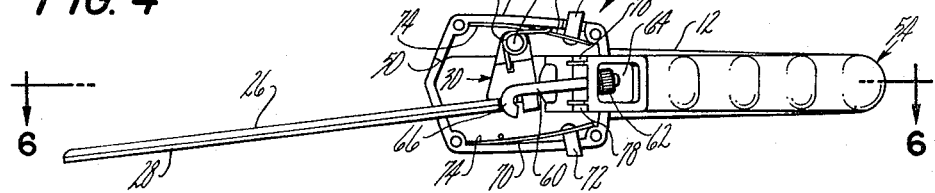
FIG. 4 is a view like FIG. 3, but it shows the movable blade in its closed position relative to the fixed blade.

This upper or vertical blade 26 projects out of the open front end of the housing 16 and it is pivotally supported within the housing for movement from an open position relative to the fixed lower blade 20, such as shown in FIG. 2 and also in FIG. 3, to a closed position (FIG. 4). In moving from the aforesaid open to the closed position, the cutting edge 28 of the upper blade 26 rides over the cutting edge 24 of the lower blade 20 in point contact therewith throughout their longitudinal extent. The means pivotally supporting the upper blade 26 for such movement comprises a member 30 (FIGS. 3–5) which is preferably plastic injection molded. The said member is molded or otherwise formed with a downwardly projecting pintle 32 which is rotatably received in a circular opening 34 in the lower shear blade 20. The member 30 also has an additional stud or pintle (not seen) which is formed coaxially with the pintle 32 and which projects upwardly to be rotatably received in an opening 36 (FIG. 5) formed in the housing 16 on the bottom of the upper handle 10. The common axis of the lower pintle 32 and the upper pintle provides the pivot axis for the movable upper blade 26, and it will be observed that the pivot axis is horizontally space from the vertical plane of the body of the upper blade 26 and from its approximate centerline.

The upper blade 26 is connected to the pivot member 30 by means of a longitudinally projecting finger 38 on the blade which is thrust into a corresponding opening or slot 40 in a block appendage 41 on the member 30 (FIG. 5), and also by means of a notch 42 cut in the upper edge of the said blade and which receives a second block 44 provided on the member 30. The finger and slot and notch and block means provides for a rigid but nonetheless easily detachable connection between the pivot member 30 and the upper blade 26. It is to be noted that the block 44 and notch 42 are formed on the member 30 and blade 26 respectively so that the cutting edge 28 of the said blade will be canted downwardly. That is, when the blade 26 is in the open position shown in FIGS. 1–3, its projecting tip will be disposed in a lower horizontal plane than the cutting edge 24 of the lower blade 20. However, due to the inherently resilient nature of the plastic pivot member 30, it can be twisted slightly while the upper blade 26 is being closed and while it rides over the cutting edge 24 of the lower blade 20 to the fully closed position wherein it is disposed over the lower blade 20.

The movable upper blade 26 is biased toward its open position relative to the fixed lower blade 20 by a torsion spring 46 which surrounds the lower pintle 32 on the pivot member 30 having one end engaged in a notch 48 in said member and having its other end pressing against a side wall of the housing 16. The fully open position of the upper blade 26 relative to the lower blade 20 is set by a shoulder or stop 50 (FIGS. 4 and 5) formed on the housing 16 at one side of the front opening therein. The closed position of the upper blade 26 where in it is disposed over the lower blade 20 is fixed by a similar stop 52 (FIGS. 3 and 5) formed on the housing 16 at the opposite side of the front opening thereof. The movable upper blade is moved from its aforedescribed open position to its aforedescribed closed position by operation of a lower handle, indicated generally by the reference numeral 54 which will now be described.

As shown in FIGS. 1 and 6, the lower handle 54 is pivotally connected with the upper handle 12 for movement relative thereto in a substantially vertical plane from a lower position (the full line position of FIG. 1) which corresponds to the open position of the upper blade to an upper position (broken lines in FIG. 1 and the position shown in FIG. 6) which corresponds to the closed position of the said upper blade. The pivotal connection between the handles 12 and 54 is defined by providing one of them, the upper handle 12, with a transversely extending parti-cylindrical socket 56 and by providing the other one (the lower handle 54) with a mating bifurcated projection 58. This eliminates the need for a pivot pin connection between the handle members and, obviously, it makes their connection or assembly that much easier.

The aforedescribed pivotal connection between the handle members is maintained by the force of the blade spring 46. That is, this force which urges the upper blade 26 toward open position is transmitted through a link 60 to the handle 54 to bias it downwardly or toward open position while maintaining the lower handle projection 58 thrust into the upper handle socket 56. It will be observed that the effective length of the link 60 can be adjusted by a nut 62 threaded on one end thereof within a recess 64 in the lower handle 54. The link 60 has a hook 66 formed at its other end, this hook being received within a notch 68 (FIG. 5) defined in the lower edge of the upper blade 26. Thus, as the operator simultaneously grasps both handles 12 and 54 within one hand and closes the lower handle 54 on the upper handle 12, the upper blade 26 is swung from its open position to its closed position. At the same time, and due to the location of the notch 68 in the lower edge of the upper blade 26, the said upper blade is biased downwardly as it is being closed to enhance the force of the point contact of the upper blade with the lower blade as the upper blade rides over the cutting edge of the lower blade.

As has been mentioned, it is a further feature of the present invention to provide latch means operable from either side of the housing 16 to engage and secure the lower handle 54 in position when the shear blades are closed. By being operable from either side, operation of the shears with either the left hand or right hand is made easier. The preferred latch means comprises a pair of plastic injection molded latch members 70, 70 (FIG. 5). Each such member comprises a latch pin 72 and an attached leaf or resilient portion 74, and they can be formed integrally or separately. Each pin 72 projects through a suitable opening at the respective side of the housing 16, and the associated spring leaf 74 is located at the side of the housing behind a pin. In the one case, the leaf is located behind the pin 32 on the pivot member 30 and at the other side the leaf is located behind a molded pin 76 in the housing 16.

These latch members 70, 70 are operable independently or in unison to be pressed inwardly to engage the lower handle 54 when it is in closed position, the area of engagement being indicated at 78, 78 for the respective latch members. When thus engaged, the handle 54 is latched or retained substantially in the open position of the blades. In order to release the latches, it is only necessary to squeeze the handle 54 with a slight additional force toward the handle 12 which will permit the latches 70, 70 to spring outwardly where they are readily accessible at the sides of the housing 16.

What is claimed is:

1. A shears comprising an upper handle, a lower shear blade rigidly connected to said upper handle, an upper shear blade pivotable from an open position across an edge of the lower blade to a closed position over the lower blade, a resilient member pivotally supporting said upper blade for movement between open and closed positions on a generally vertical axis which is horizontally spaced from the approximate centerline of said upper blade and which engages said upper blade to bias the same downwardly to cause it to ride over said edge of the lower blade substantially in point contact therewith as the upper blade is moved from open to closed position, a lower handle pivotally supported relative to said upper handle and connected with said upper blade for closing the same as said lower handle is moved in one direction, and means biasing said upper blade toward open position.

2. A shears comprising an upper handle, a lower shear blade rigidly connected to said upper handle, an upper shear blade pivotable in a scissors-like action relative to said lower blade from an open position across one edge of the lower blade to a closed position over the lower blade, a resilient member pivotally supporting said upper blade for movement between open and closed positions on a generally vertical axis which is horizontally spaced from the approximate centerline of the upper blade and which engages said upper blade to bias the same downwardly, a lower handle pivotally supported relative to said upper handle and connected with said upper blade to close the same as said lower handle is moved in one direction and tending to pivot said upper blade downwardly so as to cooperate with said resilient member in causing said upper blade to forcibly ride over the said edge of the lower blade substantially in point contact therewith as the upper blade is closed, and means biasing said upper blade toward open position.

3. A shears as defined in claim 2 wherein said lower shear blade normally is disposed in a generally horizontal plane and the upper shear blade normally is disposed in a generally vertical plane.

4. A shears comprising an upper handle having an open hollow bottom portion, a lower shear blade rigidly secured to the bottom of said upper handle to cooperate therewith in defining a housing which is open at the front and rear, an upper shear blade projecting through the open front of said housing for movement from an open position across one edge of the lower blade to a closed position over the lower blade, a resilient member pivotally supporting said upper blade in said housing for such movement on a generally vertical pivot axis which is horizontally spaced from the approximate centerline of said upper blade and which engages said upper blade to bias the same downwardly to cause it to ride over said edge of the lower blade substantially in point contact therewith as the upper blade is moved to closed position, spring means in said housing biasing said upper blade to open position, and a lower handle pivotally supported relative to said upper handle and connected through the rear opening of said housing to the upper blade to close the upper blade as the lower handle is pivoted toward the upper handle.

5. A shears comprising an upper handle, a lower shear blade rigidly secured to said upper handle, an upper shear blade pivotally secured relative to said lower blade for movement on a generally vertical axis from an open position across one edge of the lower blade to a closed position over said lower blade, spring means biasing said upper blade toward open position, and a lower handle pivotally connected to said upper handle and having means connected with said upper blade to close said upper blade when the lower handle is moved toward said upper handle, the pivotal connection between said handles being defined by providing a socket on one and a mating projection on the other, and the said pivotal connection being maintained by the force of said spring means transmitted through the means connecting said lower handle and upper blade.

6. A shears as set forth in claim 5 wherein the said socket is provided in the upper handle and the projection is provided on the lower handle.

7. A shears comprising an upper handle of generally Z-shape with the bottom portion thereof being open and hollow, a lower shear blade rigidly secured to the bottom of said upper handle to project forwardly therefrom and to cooperate with the bottom portion thereof to define a housing which is open at the front and rear, an upper shear blade pivotally supported in said housing and projecting forwardly therefrom for movement from an open position across one edge of the lower blade to a closed position over the lower blade, spring means in said housing biasing said upper blade to open position, a lower handle pivotally connected to said upper handle for movement in a generally vertical plane, and a link interconnecting said lower handle and upper blade at the rear end of said housing, the pivotal connection between said handles being defined by providing a socket on one and a mating projection on the other, and the said pivotal connection being maintained by the force of said spring means transmitted through said link to said lower handle.

8. A shears as set forth in claim 7 wherein the said socket is provided in the Z-shaped upper handle between its upper and intermediate portion and the projection is provided on the lower handle.

9. A shears comprising an upper handle, a lower shear blade rigidly secured to said upper handle and residing normally in a generally horizontal plane and having a sharpened edge which is offset upwardly from the plane of the blade body, an upper shear blade pivotally mounted relative to said lower blade and residing normally in a generally vertical plane and being movable from an open position wherein the major portion of its length is spaced horizontally from said lower blade and its said edge to a closed position wherein it is disposed over said lower blade, the bottom edge of said upper blade being sharpened and offset horizontally from the plane of its body in the direction of said lower blade considered with the upper blade open, means biasing said upper blade toward open position, and a lower handle connected with said upper blade and pivotally connected to said upper handle for closing said upper blade.

10. A shears comprising an open bottom housing which also has front and rear openings, a lower shear blade rigidly secured to the bottom of said housing and projecting forwardly therefrom, an upper shear blade projecting through the front opening of the housing for movement from an open position across one edge of the lower blade to a closed position over the lower blade, a resilient member pivotally supporting said upper blade in said housing for movement on a generally vertical pivot axis which is horizontally spaced from the approximate centerline of said upper blade and which engages said upper blade to bias the same downwardly to cause it to ride over said edge of the lower blade substantially in point contact therewith as the upper blade is moved to closed position, spring means in said housing biasing said upper blade to open position, an upper handle connected with said housing, and a lower handle pivotally supported relative to said upper handle and connected through the rear opening of said housing to the upper blade to close the upper blade as the lower handle is pivoted toward the upper handle.

11. A shears comprising an open bottom housing which also has front and rear openings, a lower shear blade rigidly secured to the bottom of said housing and projecting forwardly therefrom in a generally horizontal plane and having a cutting edge portion residing in a generally horizontal plane, an upper shear blade projecting through the front opening of the housing and pivotally mounted in said housing relative to said lower blade and residing normally in a generally vertical plane and having a cutting edge portion residing in a generally vertical plane, said upper blade being movable from an open position wherein the major portion of its cutting edge portion is spaced horizontally from said lower blade to a closed position wherein it is disposed over said lower blade, means biasing said upper blade toward open position, an upper handle connected with said housing, and a lower handle pivotally supported relative to said upper handle and connected through the rear opening of said housing to the upper blade to close the upper blade as the lower handle is pivoted toward the upper handle.

References Cited
UNITED STATES PATENTS

| | | | |
|---|---|---|---|
| 2,662,285 | 12/1953 | Yeomans | 30—248 |
| 2,683,311 | 7/1954 | Smith | 30—248 |
| 2,795,044 | 6/1957 | Henry | 30—248 |
| 2,944,340 | 7/1960 | Vosbikian et al. | 30—248 |

WILLIAM FELDMAN, *Primary Examiner.*

J. C. PETERS, *Assistant Examiner.*